United States Patent
Meier et al.

[11] Patent Number: 5,975,650
[45] Date of Patent: Nov. 2, 1999

[54] METHOD AND APPARATUS FOR CONTROLLING THE BRAKE SYSTEM OF A VEHICLE

[75] Inventors: Thomas Meier, Le Vaudove, France; Norbert Dressler, Vaihingen; Alfred Strehle, Fellbach, both of Germany

[73] Assignee: Robert Bosch GmbH, Deutschland, Germany

[21] Appl. No.: 08/722,274

[22] PCT Filed: Feb. 28, 1996

[86] PCT No.: PCT/DE96/00328

§ 371 Date: Oct. 9, 1996

§ 102(e) Date: Oct. 9, 1996

[87] PCT Pub. No.: WO96/30241

PCT Pub. Date: Oct. 3, 1996

[30] Foreign Application Priority Data

Mar. 24, 1995 [DE] Germany .................. 195 10 746

[51] Int. Cl.[6] .................. B60T 8/26; B60T 8/32
[52] U.S. Cl. .................. 303/9.62; 303/186
[58] Field of Search .................. 303/9.62, 167, 303/168, 186, 187, 188, DIG. 6, 146, 147; 701/72, 78

[56] References Cited

U.S. PATENT DOCUMENTS

| | | | |
|---|---|---|---|
| 3,764,182 | 10/1973 | Andreyko et al. | 303/186 |
| 4,943,922 | 7/1990 | Tanaka | 303/186 X |
| 5,415,469 | 5/1995 | Poggenburg et al. | 303/186 |
| 5,632,535 | 5/1997 | Luckevich et al. | 303/186 |
| 5,700,074 | 12/1997 | Sugimoto et al. | 303/186 |

FOREIGN PATENT DOCUMENTS

| | | |
|---|---|---|
| 2539687 | 7/1984 | France . |
| 4226646 | 2/1994 | Germany . |
| 2135413 | 8/1984 | United Kingdom . |

*Primary Examiner*—Matthew C. Graham
*Attorney, Agent, or Firm*—Fulbright & Jaworski, LLP

[57] ABSTRACT

For the distribution of the braking force between the front and rear axles, pressure is released in the rear-axle brakes when a predefined speed difference between a front wheel and a rear wheel is exceeded.

8 Claims, 3 Drawing Sheets

METHOD AND APPARATUS FOR CONTROLLING THE BRAKE SYSTEM OF A VEHICLE

BACKGROUND OF THE INVENTION

The invention pertains to a method and to an apparatus for controlling the brake system of a vehicle according to the introductory clauses of the independent claims.

A method and an apparatus for controlling the brake system of a motor vehicle are known from WO-A 94/13517, in which, to ensure the optimum distribution of the braking force between the front and rear axles, the difference between the wheel rpm's of the front axle and the wheel rpm's of the rear axle is determined. This slip between the front and the rear axle is compared with a predetermined limit, the absolute value of which is larger when the vehicle is driving straight ahead than when it is driving around a curve. When the detected slip exceeds this defined limit, any further pressure increase in the rear-axle brakes is prevented. Even though two different threshold values are specified to deal with two different actual driving situations, it is still possible for the pressure level at the rear axle to be too high. This is especially the case when the vehicle is traveling straight ahead, the driver brakes, the brake system stabilizes at close to the ideal braking force distribution, and the vehicle then enters a curve. Because the pressure level in this case is too high, the rear wheels tend to lock, which is reduced by an antilock protective function. When the antilock protective function is activated, pressure is reduced in the rear-wheel brakes; because of the associated startup of the return pump at this point, a strong reaction is produced at the brake pedal. This sudden reaction at the brake pedal can confuse the driver and thus lead to unwanted situations.

It is therefore the task of the present invention to provide measures for ensuring the almost complete stability of the vehicle in the partial braking range even without any intervention by the antilock protection. At the same time, the driver should experience little or no reaction at the pedal.

SUMMARY OF THE INVENTION

According to the invention, the brake pressure at the rear axle brakes is released when the difference between the speed of a front wheel and the speed of a rear wheel exceeds a predetermined threshold.

The method according to the invention ensures, during the braking process, the almost complete stability of the vehicle in the partial braking range without the need to actuate the antilock controller.

It is especially advantageous that the antilock controller is called upon to intervene less often, which has the effect of prolonging the service life of the components.

It is also advantageous that two velocity difference thresholds (slip thresholds) are specified; when the first threshold is exceeded, pressure is maintained in the rear-axle brakes; when the second difference threshold is exceeded, pressure is released in the rear-axle brakes. As a result, it is possible for the pressure to be released in the rear-axle brakes without any additional sensor signals.

Because the second velocity difference threshold is more sensitive than the slip threshold which activates the antilock controller, the advantageous result is obtained that the pressure is released at the rear axle before the antilock controller intervenes.

It is especially advantageous that, during the release of pressure at the rear axle, the motor of the return pump is not driven, and thus there is no perceptible reaction at all or only a very weak one at the brake pedal.

By turning on the motor of the return pump for a predetermined length of time upon conclusion of the braking process, the storage chamber which allows the pressure to be equalized during the release of pressure is emptied.

It is advantageous in this regard for the actuation time to be specified as a function of the quantity of operating medium to be pumped out.

Additional advantages can be derived from the following description of exemplary embodiments and also from the dependent claims.

DESCRIPTION OF EXEMPLARY EMBODIMENTS

Figure 1:
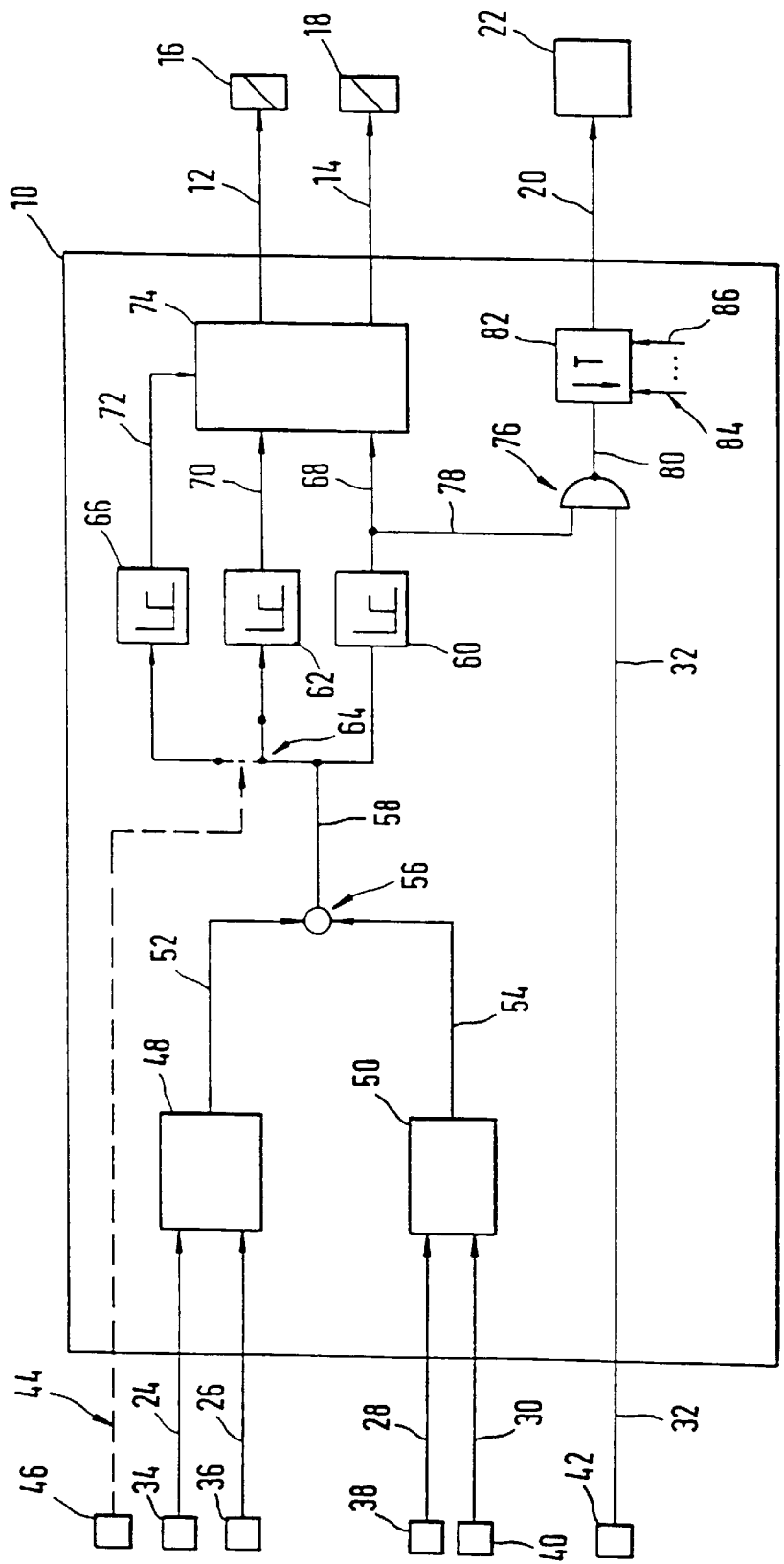
FIG. 1 shows a general circuit diagram of a control system for the brake system of a vehicle, in which the method according to the invention is realized.

In FIG. 1, a control unit, 10, actuates valves 16, 18 via output lines 12, 14 to control the brake pressure in the rear-axle brakes. Control unit 10 also controls a motor 22 of a return pump via output line 20; when the pressure is being released, this pump conveys the pressure medium flowing into a storage chamber to a reservoir. In addition to the illustrated actuation of the rear-axle brakes, control unit 10 also performs other functions, not shown for the sake of clarity. It functions as an antilock controller, for example, in connection with which the brake valves assigned to the front wheels are also actuated to control the pressure. Valve assemblies 16, 18 consist of one or more valves, which make it possible for the pressure to be built up, maintained, and released in the associated wheel brake. In the preferred exemplary embodiment, this is achieved by 2/2-magnetic valves per wheel brake, one being connected to serve as in inlet valve, the other as an outlet valve.

To receive input, the control unit has, at minimum, input lines 24, 26, 28, 39 as well an input line 32. Input lines 24 and 26 transmit speed signals from speed sensors 34, 36 at the front wheels to the control unit. In a similar way, input lines 28, 30 transmit speed signals from speed sensors 38, 40 at the rear wheels of the preferably two-axle vehicle. In the case of vehicles with more than 2 axles, the number of speed sensors will be increased correspondingly. Line 32 carries a signal from a brake pedal switch 42, which detects the actuation of the brake by the driver. In a preferred exemplary embodiment, control unit 10 also has an input line 44, which transmits a signal representing the steering angle from a corresponding sensor 46. If desired, a transverse acceleration sensor can be used instead of steering angle sensor 46 to detect when the vehicle is driving around a curve; or the control unit can determine whether the vehicle is driving straight ahead or around a curve from a comparison of the wheel rpm's of the wheels of one axle, preferably the steerable axle. In the latter case, the control unit realizes that the vehicle is driving around a curve when a specified speed difference is exceeded and realizes that the vehicle is driving straight ahead when the difference is below the specified value.

In control unit 10, for which only the function for distributing the brake power according to the method of the invention is illustrated, input lines 24, 26 lead to a unit 48, whereas input lines 28, 30 lead to a unit 50. Output line 52 of unit 48 leads to a comparison stage 56, as does output line 54 of unit 50 as well. Output line 58 of the comparison stage leads to a first threshold stage 62 and also to a second threshold stage 60. By means of a switching element 64, which can be switched via line 44 as a function of whether the vehicle is driving straight ahead or around a curve, line 58 can be connected to a threshold stage 66 instead of threshold stage 62. Output line 68 of threshold stage 60, output line 70 of threshold stage 62, and output line 72 of threshold stage 66 lead to a drive element 74, the output lines of which are lines 12, 14. In addition, a unit 76 is also provided, to which a first line 78 branching from line 68 and a second line 32 are connected. Output line 80 of unit 76 leads to a time element 82, which can be influenced by additional operating variables (suggested by input lines 84–86). The output line of time element 82 is line 20 for actuating pump motor 22.

In a preferred exemplary embodiment, the fastest-turning front wheel is determined in unit 48 as part of a maximum value selection process, and the corresponding rpm value is transmitted over line 52 to comparison site 56. In a corresponding manner, as part of a minimum value selection process, the slowest-turning rear wheel is determined in unit 50 and sent to comparison site 56. This comparison stage calculates the difference between the speed of the fastest front wheel and the slowest rear wheel. When it is recognized that the vehicle is driving around a curve, the difference thus formed is transmitted to threshold stages 60, 62. When the incoming difference exceeds the corresponding threshold value, the stage in question makes a signal available at its output. The threshold value stored in threshold stage 62 is smaller in value than the value stored in threshold stage 60. Thus, when actuating element 74 detects a signal coming over line 70 from threshold value stage 62, it maintains a constant pressure in the wheel brakes of the rear axle. When actuating element 74 recognizes an output signal from threshold stage 60, it decreases the pressure by a predetermined amount by generating appropriate release pulses of predetermined length. When it is found that the vehicle is driving straight ahead, switching element 64 switches to the position shown in broken line. This means that, instead of threshold stage 62, threshold stage 66 is now active. The threshold value stored there is larger than that stored in threshold stage 62 but smaller than that of threshold stage 60. The output signal of threshold stage 66 has the result that actuating element 74 maintains the pressure in the rear-wheel brakes.

The threshold value in threshold stage 60 is to be selected so that the slip between the front and rear wheel rpm's is smaller than the slip threshold which activates the antilock controller. The result of this is that the release of pressure at the rear axle begins even before the rear wheels start to lock. The return pump is not allowed to run during this release of pressure. The pump does not start to run until after the braking process has been completed. This is recognized by a corresponding change in the status of the signal coming from brake pedal switch 42. If, upon completion of a pressure release at the rear axle, the braking process is over, then, after a certain delay to avoid an unnecessary response in the case of only brief disturbances, time element 82 is activated. This actuates the return pump motor for a defined period of time, as a result of which the pump conveys the pressure medium which has been introduced into the storage chamber back to the reservoir. The defined time period can be determined experimentally. In an advantageous exemplary embodiment, furthermore, the time period is a function of the number of release pulses transmitted. In general, the time period is determined in such a way as to allow the amount of pressure medium which has arrived in the storage chamber to be pumped out.

Figure 2:
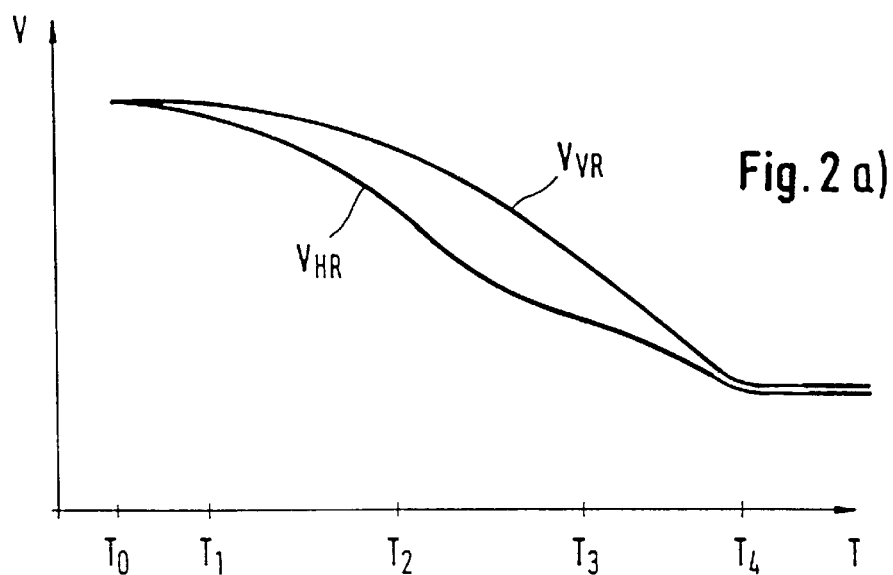
FIG. 2 shows time graphs of essential signals, which illustrate the method according to the invention.
Figure 2:
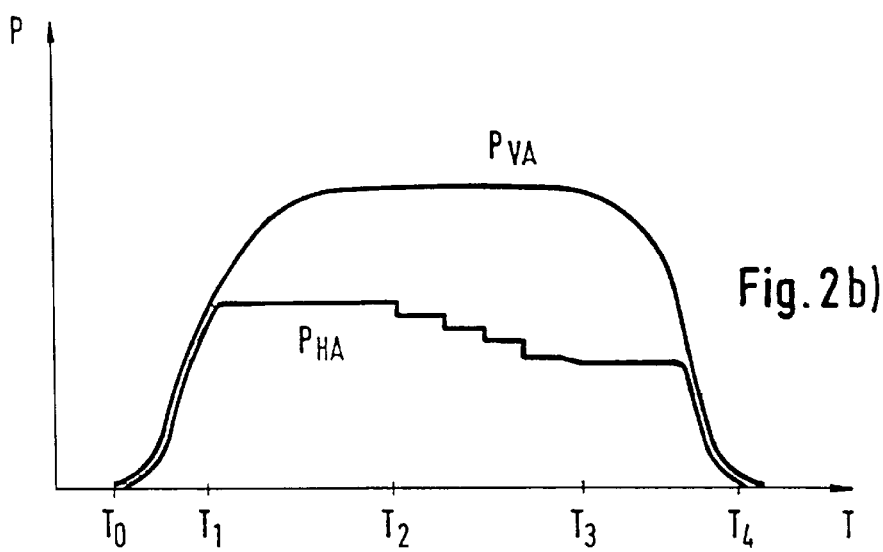
Figure 2:
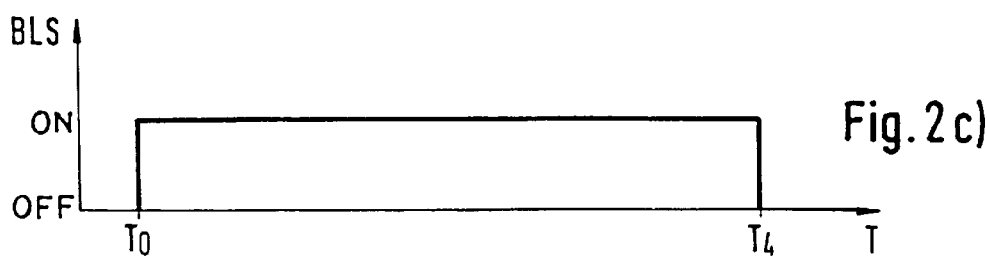
Figure 2:

The way in which the method according to the invention works is illustrated on the basis of the time graphs of FIG. 2. FIG. 2a shows the change over time in the rotational speed of the fastest front wheel (Vvr) and the slowest rear wheel (Vhr), whereas FIG. 2b shows the change in pressure at the front (Pva) and rear axles (Pha). FIG. 2c shows the status of the signal BLS of the brake pedal switch, whereas FIG. 2d shows the actuation of return pump RFP.

At time $T_0$, the driver actuates the brake pedal. The signal BLS changes its status as shown in FIG. 2c. As a result of the actuation of the brake pedal, the pressures increase uniformly at the front and rear axles starting at time $T_0$. In a corresponding manner, the speed of the front and rear wheels decreases starting at time $T_0$. At time $T_1$, the difference between the speeds corresponding to the first threshold value is reached. This leads, starting at time $T_1$, to a constant rear wheel brake pressure Pha, whereas the front wheel brake pressure Pva continues to change in accordance with the driver's command. At time $T_2$, the difference between the front wheel and rear wheel speeds also exceeds the second threshold. This leads to a defined release of the rear axle pressure, starting at time $T_2$. This is realized by the transmission of release pulses of predetermined length. At time $T_3$, the difference between the front wheel and rear wheel rpm's falls below the second threshold value. The result is a constant rear-wheel brake pressure starting at time $T_3$. The wheel rpm's now begin to approach each other again. At time $T_4$, the driver releases the brake, and the rear wheels and front wheels are now rotating at approximately the same speed. After time $T_4$, i.e., upon expiration of a predetermined filtering time at $T_4'$, the return pump is actuated to carry away the pressure medium which had been introduced into the storage chamber during the pressure-release phase between $T_2$ and $T_3$. This is done for a defined time period, possibly as a function of operating variables. At time $T_5$, upon expiration of this time period, the return pump is turned off again.

Figure 3:
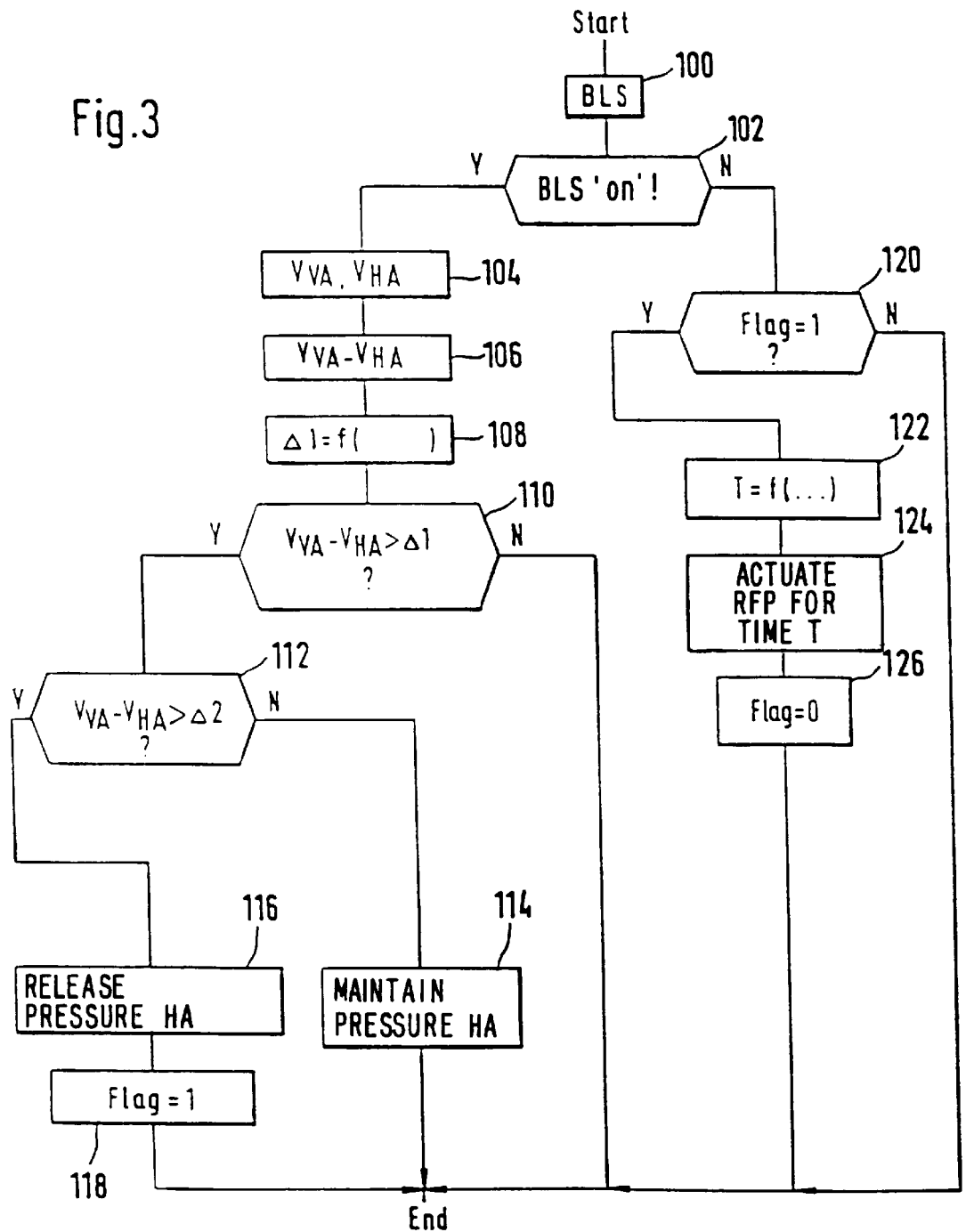
FIG. 3 is a flow diagram, which provides information on a realization of the method according to the invention in the form of a computer program.

Information on a realization of the method according to the invention as a program running on a microcomputer is presented in the form of a flow diagram in FIG. 3.

When the subprogram starts at the appropriate time, the status of signal BLS of the brake pedal switch is accepted as input in the first step 100. Then, in question step 102, the program checks to see whether the brake is actuated, that is, whether the pedal switch has been turned on. If this is the case, in step 104 the rpm's of the front and rear wheels are accepted as input. In the preferred exemplary embodiment, the speed of the fastest front wheel and the slowest rear wheel are accepted as input. Then, in step 106, the difference between the rpm's of the front wheel and the rpm's of the rear wheel is calculated and, in step 108, the first threshold value $\Delta 1$ is selected, depending on whether a curve has been recognized or not. If a curve has been recognized, the absolute value of threshold $\Delta 1$ is smaller than when the vehicle is driving straight ahead. In the subsequent question step 110, the program checks to see whether the difference between the rpm's of the front wheel and the rpm's of the rear wheel exceeds this first threshold. If this is not the case, the subprogram ends.

If the difference does exceed the threshold, the program checks in step 112 to see whether the difference also exceeds the second threshold value Δ2. If not, in step 114 the pressure at the rear axle is kept constant, whereas in the contrary case, i.e., the second threshold value is exceeded, in step 116 the pressure at the rear axle is released. After step 116, a flag is set to 1 in step 118, and the subprogram ends.

If it is recognized in step 102 that the brake pedal is not being or is no longer being actuated, in the following question step 120 the program asks whether the flag has been set to a value of 1. If this is the case, in step 122, the actuation time for the return pump is, if desired, read from a table as a function of operating variables such as the number of transmitted pressure-release pulses; then, in step 124, the pump is actuated for the time T read from the table. In step 126, the flag is set to a value of 0, and the subprogram ends. The subprogram is also terminated if it has been determined in step 120 that the flag has a value of 0.

FIG. 3, therefore, shows a method in which, when a first and a second slip threshold are exceeded by the slip between the front and rear wheels, a defined pressure release occurs at the rear axle, whereas, when only the first threshold is exceeded, the pressure in the rear axle is kept constant; otherwise, the pressure changes in accordance with the driver's command. Upon completion of the braking process, the return pump is driven for a predetermined period of time.

In the application described above, the distribution of the braking force depends on the difference between the fastest front wheel and the slowest rear wheel, but the method according to the invention can also be applied in brake power distribution controls which operate on the basis of the mean values of selected wheels, etc.

We claim:

1. Method for distributing braking force between a front axle and a rear axle of a motor vehicle having a brake system with brakes at each axle, said method comprising determining the difference between the speed of a front wheel and the speed of a rear wheel, comparing said difference to a predetermined threshold, and releasing brake pressure at the rear axle brakes when said difference exceeds said predetermined threshold, wherein said brake system includes a return pump for pumping a pressure medium from said rear axle brakes to a reservoir, said method further comprising keeping said pump turned off during release of said brake pressure.

2. Method for distributing braking force between a front axle and a rear axle of a motor vehicle having a brake system with brakes at each axle, said method comprising determining the difference between the speed of a front wheel and the speed of a rear wheel, comparing said difference to a predetermined threshold, and releasing brake pressure at the rear axle brakes when said difference exceeds said predetermined threshold, wherein said predetermined threshold is a second threshold, said method further comprising keeping brake pressure at the rear axle brakes constant when said difference exceeds a predetermined first threshold which is smaller than said second threshold.

3. Method as in claim 2 wherein, when said difference is below said first and second thresholds, the pressure in the rear axle brakes follows a driver's command.

4. Method as in claim 2 further comprising determining whether said vehicle is traveling around a curve or straight ahead, and predetermining the second threshold based on whether said vehicle is traveling around a curve or straight ahead.

5. Method for distributing braking force between a front axle and a rear axle of a motor vehicle having a brake system with brakes at each axle, said method comprising determining the difference between the speed of a front wheel and the speed of a rear wheel, comparing said difference to a predetermined threshold, and releasing brake pressure at the rear axle brakes when said difference exceeds said predetermined threshold, wherein said brake system includes a return pump for pumping a pressure medium from said rear axle brakes to a reservoir, said method further comprising actuating said pump for a predetermined period of time following release of said brake pressure.

6. Method as in claim 5 wherein said pressure medium is released into a storage chamber from which it is pumped to said reservoir, said predetermined period of time being selected to permit transfer of said pressure medium from said storage chamber to said reservoir.

7. Method as in claim 5 wherein said predetermined time is a function of the duration of pressure release.

8. Method as in claim 5 wherein said return pump is actuated a predetermined time after the driver releases the brake.

* * * * *